(12) United States Patent  (10) Patent No.: US 9,350,032 B2
Andresen et al.  (45) Date of Patent: May 24, 2016

(54) METHOD AND SYSTEM FOR STABLE DIRECT METHANOL FUEL CELL OPERATION AT VARYING LOADS AND SUB-ZERO TEMPERATURES

(75) Inventors: Visti Andresen, Odense (DK); Jacob Lindner Bonde, Skarup (DK); Joergen S. Lundsgaard, Svenborg (DK); Mads Lundstrom, Odense (DK); Madeleine Odgaard, Odense (DK)

(73) Assignee: IRD FUEL CELLS A/S, Svendborg (DK)

( * ) Notice: Subject to any disclaimer, the term of this patent is extended or adjusted under 35 U.S.C. 154(b) by 120 days.

(21) Appl. No.: 13/981,148

(22) PCT Filed: Jan. 30, 2012
(Under 37 CFR 1.47)

(86) PCT No.: PCT/US2012/023070
§ 371 (c)(1),
(2), (4) Date: Sep. 25, 2013

(87) PCT Pub. No.: WO2012/103537
PCT Pub. Date: Aug. 2, 2012

(65) Prior Publication Data
US 2014/0113208 A1  Apr. 24, 2014

Related U.S. Application Data

(60) Provisional application No. 61/437,230, filed on Jan. 28, 2011.

(51) Int. Cl.
*H01M 8/04* (2006.01)
*H01M 8/10* (2016.01)

(52) U.S. Cl.
CPC ...... *H01M 8/04559* (2013.01); *H01M 8/04552* (2013.01); *H01M 8/04753* (2013.01); *H01M 8/04798* (2013.01); *H01M 8/1011* (2013.01); *Y02E 60/523* (2013.01)

(58) Field of Classification Search
None
See application file for complete search history.

(56) References Cited

U.S. PATENT DOCUMENTS

| 6,472,090 B1 | 10/2002 | Colbow et al. ............... 429/443 |
| 2002/0192531 A1* | 12/2002 | Zimmerman et al. .......... 429/38 |
| 2003/0148149 A1* | 8/2003 | Xie et al. ........................ 429/13 |

(Continued)

FOREIGN PATENT DOCUMENTS

| CN | 101124692 A | 2/2008 |
| WO | WO2006041651 | 4/2006 |
| WO | PCT/US2012/023070 | 6/2012 |

OTHER PUBLICATIONS

International Preliminary Report on Patentability from PCT/US2012/023070, Aug. 21, 2014.

(Continued)

*Primary Examiner* — Patrick Ryan
*Assistant Examiner* — Wyatt McConnell
(74) *Attorney, Agent, or Firm* — Licata & Tyrrell P.C.

(57) ABSTRACT

Methods and systems for operation of direct methanol fuel cell (DFMC) systems with enhanced flexibility within a wide range of electrical loads as well as no external load are provided. With these methods and systems, the fuel cell operates at low power in a non shut-down state in a fully controlled manner thus allowing the fuel cell to withstand frost conditions and to maintain optimal ancillary battery capacity.

5 Claims, 2 Drawing Sheets

Concentration gradient changes with current drain (A) and without (B)

(56) References Cited

U.S. PATENT DOCUMENTS

| | | | |
|---|---|---|---|
| 2006/0204806 A1 | 9/2006 | Takada et al. | 429/434 |
| 2008/0286617 A1* | 11/2008 | Ueda et al. | 429/13 |
| 2009/0269625 A1 | 10/2009 | Odgaard et al. | 429/13 |
| 2010/0310954 A1 | 12/2010 | Odgaard | 429/429 |
| 2011/0140547 A1* | 6/2011 | Shimura et al. | 307/151 |

OTHER PUBLICATIONS

First Office Action received in Application No. 201280006878.5, Aug. 27, 2015.

* cited by examiner

Fig. 1. Concentration gradient changes with current drain (A) and without (B)

METHOD AND SYSTEM FOR STABLE DIRECT METHANOL FUEL CELL OPERATION AT VARYING LOADS AND SUB-ZERO TEMPERATURES

This patent application is a U.S. National Stage Application of PCT/US2012/023070 filed Jan. 30, 2012 and claims the benefit of priority from U.S. Provisional Application Ser. No. 61/437,230, filed Jan. 28, 2011, the teachings of each of which are herein incorporated by reference in their entirety.

FIELD OF THE INVENTION

This invention is applied to the operation and control of a direct methanol fuel cell (DFMC). The invention allows the DMFC system to operate with enhanced flexibility within a wide range of electrical loads as well as no external load. Using the present invention, the fuel cell operates at low power in a non shut-down state in a fully controlled manner thus allowing the fuel cell to withstand frost conditions and to maintain optimal ancillary battery capacity.

BACKGROUND OF THE INVENTION

Typically a DMFC fuel cell is designed to operate at specific air and fuel flows which correspond to the electrical charge transferred to a connected load. In both stationary and portable power applications fuel cell equipment is required to operate for varying time periods and at different load levels and are subjected to frequent start-up and shut-down cycles.

In normal operation the fuel cell stack is designed to operate optimally and efficiently at a pre-determined power. Operating conditions are normally trimmed to the nominal power output and the fuel cell stack does not operate optimally in extremes of low-power or near shut-down conditions. A characteristic consequence of low-power operation is the rising relative loss by cross-over diffusion of methanol fuel. Deleterious effects of cross-over diffusion in a dormant fuel-cell and its detrimental effects on re-starting from the dormant stage are described by Odgaard (Published U.S. Application 2010/0310954). In particular concentration of methanol due to partial freezing of the water constituent of the mixture can lead to corrosion of the membrane electrode assembly (MEA) and local overheating on restarting. Odgaard (Published U.S. Application 2010/0310954) teaches the use of antifreeze additions to the cell when it is shut-down in order to alleviate these start-up problems.

Difficulties in enabling a balanced and stable mode of operation in a DMFC is related to the ability to quantify accurately the methanol concentration in the single cells and in the stack as a whole.

An external, non-intrusive system and method to monitor and control methanol concentrations via electrochemical impedance spectroscopy (EIS) in an operating DMFC system has been described by Odgaard and Yde-Andersen (Published U.S. Application 2009/0269625. The method assesses the cell operating condition, and in particular the methanol concentration, during full operation without or with minimal interruption. The results obtained from the alternating current response measurements may be optionally combined or supplemented by direct voltage measurement techniques. The measurement techniques are applied in order to control and adjust the methanol concentration in the cell by either adding pure methanol or pure water to the fuel compartment. Maintenance of fuel cell efficiency depends on the ability to maintain a correct concentration of the methanol in the fuel compartment on the anode side of the membrane, reducing and compensating for unavoidable loss and on a low internal resistance in the cell. Methanol diffusion through the electrolyte membrane causes a phenomenon known as cross-over of fuel. Methanol which reaches the cathode reacts wastefully with oxygen and does not produce electrons which thus do not traverse the external electrical circuit and cannot provide useful electrical energy. This situation is aggravated when methanol concentrations in the anode fuel compartment are raised because a high methanol concentration is a driving force for diffusion of methanol through the membrane. On the other hand, maintenance of the electrochemical reaction rates depends on the supply of adequate methanol. Denudation of the methanol concentration leads to reduced power generation. In a DMFC stack, the fuel is circulated through the stack and deplenished fuel is returned to the fuel compartment. Since part of the methanol is used by the electrochemical reaction, the methanol concentration in the compartment is reduced. Consequently, the individual cell and whole stack impedance will change unless the methanol concentration is maintained. The methanol concentration increases when water is lost thereby resulting in impedance increase. It is therefore desirable to control methanol concentration in fuel cells in order to optimize efficiency of the DMFC stack and maintain output. Satisfactory control can be achieved by measuring the methanol concentration and compensating for methanol consumption. Consumption of fuel can be calculated on the basis of the electrical charge transferred. The methanol concentration can be maintained at a specified level by addition of water as diluent or addition of alcohol as a concentrate or as a pure substance. Water and methanol can evaporate from the fuel tank, thereby affecting the methanol concentration. These concentration changes can be significant and may cause large deviations from the ideal alcohol concentration.

However, it is difficult to maintain stable operation at low power, and stack performance is unreliable at low power levels, making it impossible to operate DMFC fuel cells at variable power levels. Normal practice has been either to operate at nominal full-power output or alternatively to shut-down completely.

In addition to the problems of operation at reduced power output, it is necessary to protect the cell against transient variations in methanol fuel concentration and methanol diffusion through the electrolyte membrane when approaching and establishing shut-down status. Conditions at shut-down and afterwards determine the condition of the cells and stack on resumption of operation, and thus the ease of re-starting normal operation.

Shut down is affected by terminating the supply of oxidizing air to the DMFC by shutting off the air pump. The concentration of methanol fuel at the electrode determines how the cell will survive the interruption of air supply and the ease of subsequent restart.

Further, during cold periods it is necessary to establish a means of protecting the stack and individual cells from the effects of freezing. Odgaard (Published U.S. Patent Application 2010/0310954 discloses systems and methods for protecting fuel cell systems from frost by introduction of a freezing point depressant into the fuel cell system and/or flushing the fuel cell system with an insert gas and describes further problems arising due to the reactivity of methanol even though it is a material that can depress the freezing point of water sufficiently to protect a DFMC when stored in freezing conditions. In this published patent application, methods and systems for adding to a fuel cell system a freezing point depressant that is compatible with fuel cell material components and that does not deleteriously affect electrode processes of the fuel cell system are described as well as methods and system which utilize an inert gas, preferably carbon dioxide already present in the system as a reaction product generated upon the oxidation of methanol, to flush the fuel cell system during fuel-cell-shut-down. The published patent application further provides fuel cell deactivation processes that leaves the direct methanol fuel cell (DMFC) in a non-reactive state during dormant periods and provides for carefully controlled re-activation of the dormant cell without adding complexity and without lowering efficiency of the fuel cell.

SUMMARY OF THE INVENTION

An aspect of the present invention relates to a method for operating a direct methanol fuel cell (DMFC) at variable power levels and protecting the DMFC from transient variations in ambient temperature. The method comprises continuously monitoring voltage of a stack, section and/or single cell of the DMFC; interrupting continuous operation of the DMFC suddenly and observing voltage decay; assessing cell and stack conditions and/or methanol demand based upon the measured voltages; and correctively adjusting methanol concentration of the DMFC. In one embodiment, cell and stack conditions and/or methanol demand are assessed via the algorithm $F_{MeOH\_Dose} = F_{Stoich} + F_{cross} + F_{Temp} + F_{dU/dt}$.

Another aspect of the present invention relates to a system for operating a direct methanol fuel cell (DMFC) at variable power levels and protecting the DMFC from transient variations in ambient temperature. The system of the present invention comprises a DMFC stack arranged so that denuded air exiting the stack drains downward and all fuel exiting the stack flows upward; a means for diagnostic air-interrupt function or momentarily disconnecting the DMFC from its load; a means for measuring voltage decay of a stack, section and/or single cell of the DMFC; a means for assessing the cell and stack condition and/or methanol demand based upon measured voltages; and a means for correctively adjusting methanol concentration of the DMFC.

In one embodiment, the methods and systems of the present invention operate without the use of a methanol sensor control system and/or freezing point depressant.

DETAILED DESCRIPTION OF THE INVENTION

Figure 1:
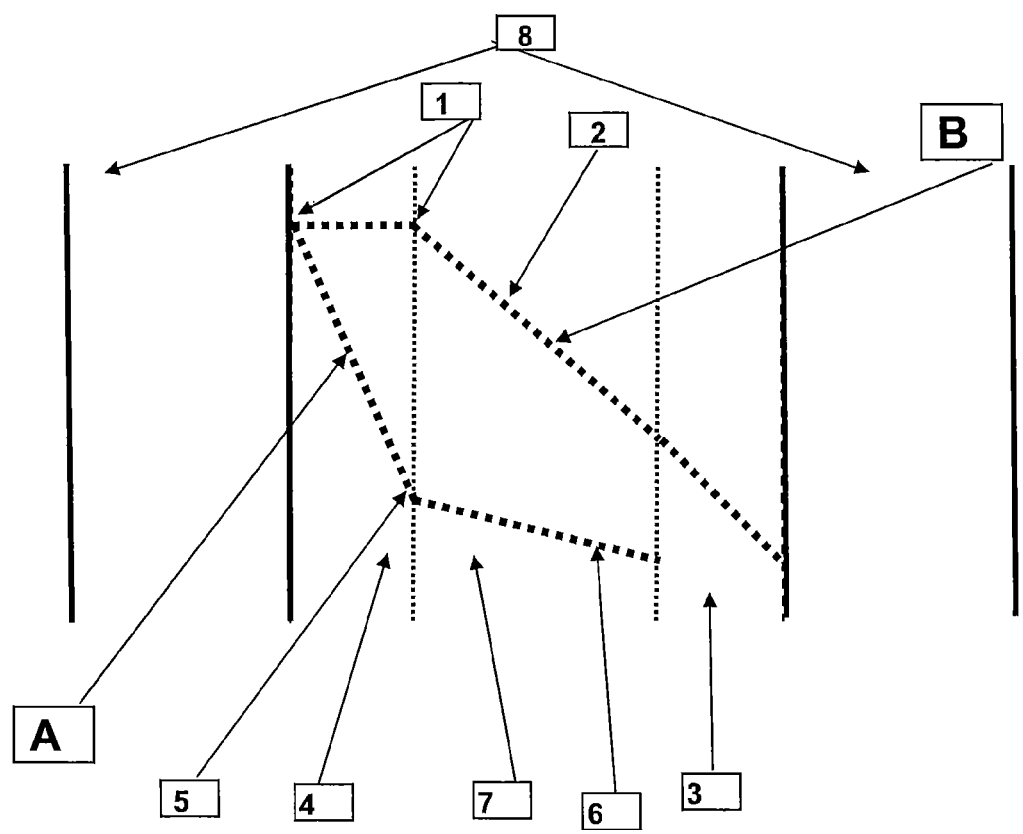
FIG. 1 is a graphic representation of the methanol concentration through the cathode electrode and the PEM electrolyte and on the right the anode electrode and shows the drop in methanol concentration from the cathode side to the anode through the PEM.

In the following description, V1 is the open cell voltage, also referred to herein as OCV, and V2 is the cell voltage after air interruption. V1 approaches 0 Volts if no fuel or oxidant is present. If air and fuel is present then V1 should, in theory, approach 1.23V. Some of the fuel will cross-over by permeation to the cathode side of the membrane electrolyte, and some of the oxidant will permeate over to the anode side, so the cell mixed potential will be lower than the theoretical value.

The V2 cell potential is a function of the amount of methanol on the cathode side, being severely effected by the reverse cell potential generated by cross-over of methanol to the cathode side where oxidant is readily available, which is not the case in the fuel stream at the anode. V2 will equal the V1 if no methanol is present and V2 will fall to zero if there is sufficient methanol to reduce all the oxygen at the cathode. The OCV value is thus determined by the amount of methanol crossing over to the cathode. Methanol permeation is driven by a concentration gradient so a higher methanol concentration drives a higher diffusion rate and thus leads to lower OCV.

At least 3 cases of methanol supply side concentration are considered when air supply to the DMFC is interrupted.

As discussed above, the normal OCV of a cell adequately supplied with methanol fuel and air oxidant is 1.23 Volts and approaches 0 Volts when no fuel or oxidant is present. However, since some methanol fuel will diffuse to the cathode and some oxidant will diffuse to the anode, causing the formation of a reverse electrochemical reaction, a mixed potential will result which is lower than the theoretical value. In the DMFC system the OCV value measured is a result of the preferred electrochemical reaction and the effects of the reversed cell reaction and is determined by the amount of methanol crossing over to the cathode. Thus, if the fuel concentration is raised to a higher methanol concentration a reduced OCV level results.

In the first case the methanol concentration on the fuel side at the anode is in the normal range, nominally 1M. When the air supply is interrupted the OCV drops by approximately 0.9 Volts to a low value in a period of 2 to 5 seconds. This case represents the preferred shut down state whereby the cell is maintained in a state of preparation for restart. It is achieved by carefully regulating methanol flow to match the charge delivered to the electrical load in the period before air-flow is interrupted. The procedure requires skill and experience and takes considerable effort and time to complete.

The second case arises when the methanol concentration in the cell is high just prior to interruption of the flow of oxidant to the stack at shut-down. Under these conditions the OCV at air interruption is lower than normal and less than 0.9 Volts. On interruption of oxidant flow the cell voltage drops within 2 seconds. A high methanol diffusion due to the high concentration gradient provides an excessive amount of methanol to the cathode side due to cross-over, where it readily oxidizes, blocking the cathode catalyst, and there is a risk of damaging the cell materials due to thermal overload. The cell is not operable under these conditions and it requires remedial measures in order for the cell to restart.

A third case arises where methanol concentration is too low. In this situation the stack reaches operating temperature sluggishly and there is a risk of fuel starvation which irreversibly damages the stack by local cell reversal thus leading to damage of MEA materials primarily due to carbon erosion and removal of catalyst metals such as ruthenium by corrosion.

The cases described above illustrate the need to maintain secure control of conditions in the stack as a whole as well as the single cell.

However, mass balance calculations on the electrochemical and chemical reactions near the electrolyte membrane can be made difficult by a non-linear dependence of the rate of methanol diffusion on the concentration of methanol at the electrolyte membranes fuel rich side. The crossover of fuel methanol through the polymeric electrolyte membrane has been studied in a single direct methanol fuel cell (Comparative Studies of a Methanol Crossover and Cell Performance for a DMFC. Rongzong Jiang and Deryn Chu. J. Electrochem. Soc. 2004 151 (1) A69-A76). Diffusion through the Nafion electrolyte membrane was determined by monitoring the amount of $CO_2$ produced from methanol oxidation. The equivalent current of methanol crossover was calculated from the discharge current of the fuel cell and the quantity of carbon dioxide collected at the anode and the cathode exhausts.

The present invention provides methods and systems for operating a direct methanol fuel cell (DMFC) at variable power levels and protecting the DMFC from transient variations in ambient temperature. Methods of the present invention comprise continuously monitoring voltage of a stack, section and/or single cell of the DMFC; interrupting continuous operation of the DMFC suddenly and observing voltage decay; assessing cell and stack conditions and/or methanol demand based upon the measured voltages; and correctively adjusting methanol concentration of the DMFC. Systems of the present invention comprise a DMFC stack. The DMFC stack is arranged so that denuded air exiting the stack drains downward and all fuel exiting the stack flows upward. The DMFC stack is further fitted with a means for diagnostic air-interrupt function or momentarily disconnecting the DMFC from its load; a means for measuring voltage decay of a stack, section and/or single cell of the DMFC; a means for assessing the cell and stack condition and/or methanol demand based upon measured voltages; and a means for correctively adjusting methanol concentration of the DMFC.

These methods and systems are aimed at operating a fuel cell at a predefined power output and stack temperature using a periodic diagnostic function. This periodic diagnostic function measures the cross over by diffusion of methanol under various conditions and adjusts the fuel methanol concentration in order to maintain both the stable output and temperature. The methods and systems of the present invention enable allowance to be made for methanol diffusion through the PEM. Thus, at normal operating temperature of, for example, 70° C., the cell can operate at all output demands from very low to maximum output. Furthermore, using the diagnostic technique in accordance with the methods and systems of the present invention, the cell can be placed in a stand-by condition, e.g. at 5° C., regardless of ambient temperature, so that the cell does not need any freezing point depressant or other means to prevent damage from frost.

The periodic diagnostic technique used in the present invention involves perturbation of operation to measure the voltage decay immediately after the cell operation is suddenly interrupted. Methods or means of perturbation include, but are not limited to, suddenly stopping oxidant supply and disconnecting the stack from its load. In method A, wherein oxidant supply is suddenly stopped, the area under the decay curve shown in FIG. 2 (see Number 4), is used to quantify the concentration of methanol at the cathode. This is an expression of the rate of diffusion of methanol to the cathode that cause polarization and inhibits freezing due to the generation of heat through methanol oxidation by the air available. Method B involving disconnection of the stack from its load arrives at the same quantification of the rate of methanol diffusion by calculation the diffusion rate from the transient curve. The diffusion rate is proportional to the voltage decay rate which is calculated from the decay curve. See FIG. 2, Number 2.

The objective of the methods and systems of the present invention is to maintain a specified temperature and power drain without external manipulation in all ambient temperature conditions from frost to hot summer by using the diagnostic technique to measure methanol loss from the anode side to the cathode side by diffusion and compensating for this loss at all operating conditions by means of adjusting the methanol concentration in the feed by supplying the correct amount of 100% methanol in order to maintain operational stability. This is done by supplying concentrated (e.g. 100% methanol) from a tank by means of a pump. With the method and system of the present invention, an optimal amount of methanol can be maintained at the MEA in any arbitrary chosen output power setting. Using the method and system of the present invention during start-up phases, normal operation at varying power output and shut-down to stand-by, a selected temperature at the MEA surface and in the stack can be maintained thus preventing frost damage. The present invention provides a means for control of stack operation conditions at all levels of power from zero to maximum nominal power output continuously and allows a stack to operate in a much wider envelope of operating conditions than previously. Accordingly, the methods and systems of the present invention avoid the use of methanol sensor control systems. This facilitates the replacement of passive shut-down and risk of freezing by a controlled active shut-down and start-up without the use of peripheral control sensor devices and procedures. Such systems and methods obviate the need for adding and flushing freezing point depressants.

At the same time, the methods and systems of the present invention, through a diagnostic air-interrupt function or momentary disconnect of the DMFC from its load and provision of precise data on the concentration effect on methanol diffusion rates, enable precise evaluation of cell and stack condition and adequate and precise determination of methanol demand in order to maintain an arbitrary power drain and/or stack temperature. This has not been done before and stacks with the methods and systems of the present invention currently operate in binary conditions of on or off with risk of frost damage in the passive state.

It is an aspect of the present invention to enable the maintenance of frost free conditions in the stack by utilizing the energy released by oxidation of diffusing of methanol fuel to the cathode and thereby eliminating the need for addition of frost-protecting liquid to the cell on storage in freezing conditions.

It is another aspect of the present invention to enable correction of the common experimental deviation of measuring methanol cross-over caused by $CO_2$ permeation through polymeric electrolyte membrane.

The methods and systems of the present invention determine the exact dosage of fuel methanol required to satisfy the selected operating condition by solving an equation for fuel demand based on four factors. There are:

The stoichiometric faradaic conversion compensated by a term covering mass loss due to evaporation;

A factor compensating precisely for methanol lost due to cross-over diffusion;

A factor for compensation for the temperature effects on chemical reactions and maintaining a proper operating temperature in the stack; and a hitherto unexploited factor based on the results of transient effects on open cell voltage when cell operation is temporarily interrupted either by interrupting air flow or by disconnecting the cell.

The algorithm used in the methods and systems of the present invention for determining methanol demand is the following:

$$F_{MeOH\_Dose} = F_{Stoich} + F_{cross} + F_{Temp} + F_{dU/dt}$$

where:

$F_{MeOH\_Dose}$ is the amount of pure methanol supplied to the anode mixing chamber of the DMFC fuel cell.

$F_{Stoich}$ consists of two elements $F(I) + F_{evap}(T)$ and is the amount of methanol reactant to be supplied to the anode mixing chamber of the DMFC fuel cell due to consumption by current supply and evaporation losses. The element F(I) is the stoichiometric electrochemically-consumed methanol equivalent converted into current (I), and the element $F_{evap}(T)$ is the temperature dependent, experimentally determined, amount of methanol lost to the system by evaporation.

$F_{cross}$ is the amount of methanol supplied to the anode mixing chamber of the DMFC fuel cell in order to compensate for methanol diffusion from anode to cathode. $F_{cross}$ is dependent on the choice of membrane material and temperature, and non-linearly dependent on the current drawn from the fuel-cell. $F_{cross}$ is experimentally determined for different materials at different temperatures. This nonlinear function is partly responsible for the feed back response which desirably maintains the fuel cell at the specified operating conditions.

$F_{Temp}$ is a function that determines the optimal operating temperature of the stack by controlling the methanol flow. The function determines whether methanol is added when the temperature is too low and reduces methanol supply if the temperature is too high. Determination of the value of $F_{Temp}$ is of critical importance especially when operating at low power and sub zero temperatures. This control technique enables the cell to operate at just the right power and temperature in start-up and shut-off conditions and facilitates an active shut-down at low power and low temperature. $F_{Temp}$ is thus non-linearly dependent on current drain from the fuel cell stack, and dependent on choice and dimensions of polymer electrolyte membrane (PEM) material and temperature. $F_{Temp}$ is experimentally determined for the given stack configuration, comprising choice of membrane material, and is determined at various operating temperature and current drain values.

$F_{dU/dt}$ is a function that is determined by the cell potential during a diagnostic current step or alternatively by a perturbation of fuel and oxidant flow. A current change event is incurred in order to discern whether the methanol concentration at the anode corresponds to a desired value. Current drain is suddenly interrupted and restored for a short period of time from 10 to 100 seconds. The methanol concentration can be determined by determining the first derivative dU/dt of the voltage-time response. Alternatively the integral of the voltage response may be calculated and used to determine methanol concentration at the anode. The cell voltage is affected by a complex interaction of electrode kinetics and mass-transport transients so that these rapid and reversible transient responses to load changes are utilized in order to determine the amount of reactant methanol available at the anode.

FIG. 1 shows the differences in methanol concentration gradient across the section of a single fuel cell. Two schematic representations, Part A and Part B, are depicted in FIG. 1. Part A shows the methanol concentration drawn as the ordinate (y-axis) while the cell is producing current; and Part B illustrates the concentration of methanol when the current drain is interrupted. The cell is bound by a pair of bipolar separator plates (see FIG. 1, Number 8) between which is sandwiched the cathode electrode (see FIG. 1, Number 4), polymer electrolyte membrane (see FIG. 1, Number 7) and the anode electrode (see FIG. 1, Number 3). When the cell circuit is open, the methanol concentration at the anodic interface of the polymer electrolyte membrane is the same as at the exterior surface of the anode electrode as shown in FIG. 1, Number 1. When there is no significant methanol consumption, there will be very little concentration change across the electrode as shown in FIG. 1, Number 1. Methanol has sufficient time to saturate the anode electrode and a consequence is the establishment of a steep concentration gradient (see FIG. 1, Number 2) traversing the PEM, driving methanol diffusion from the anode side to the cathode side (see FIG. 1, Number 3) of the PEM. Here, the methanol crossing over by diffusion is oxidized, leading to a polarization potential that lowers the observed cell potential compared to the initial open cell voltage. After a period of typically 200 to 300 second, a stable reduced cells voltage, somewhat lower than the OCV, is observed. When current is drawn from the cell (Part A of FIG. 1), methanol is anode is consumed and the concentration at the anode/PEM electrode (see FIG. 1, Number 5) decreases and approaches zero at the cathode/PEM interface (see FIG. 1, Number 6). The concentration gradient traversing the PEM (see FIG. 1, Number 7) is low and methanol transferred over to the cathode (see FIG. 1, Number 3) is completely oxidized. Under these conditions, the open cell voltage approaches the theoretical value and is unaffected by polarization.

Figure 2:
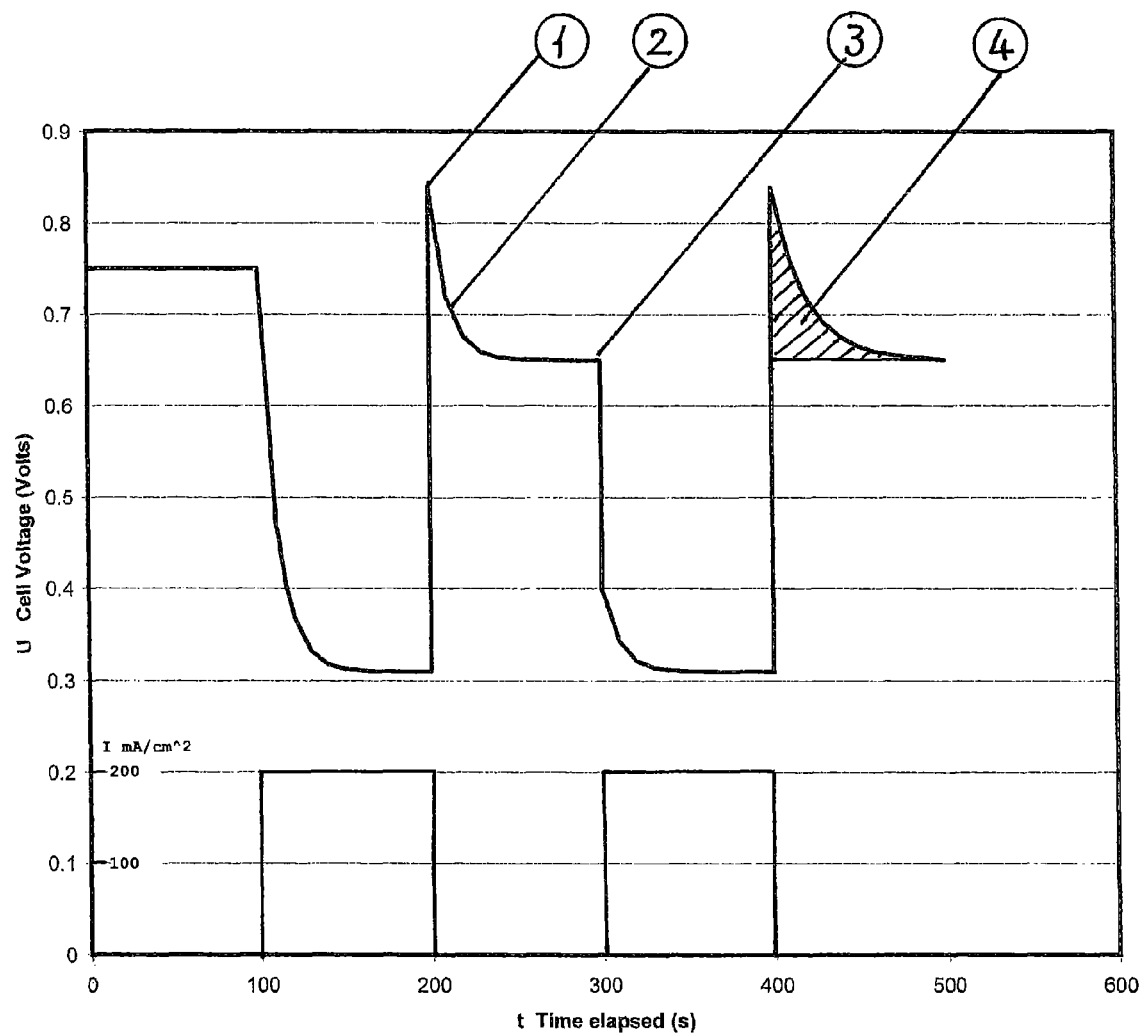
FIG. 2 is a graph depicting the decay profile for cell voltage after a sudden interruption in current drain.

FIG. 2 depicts the decay profile for the cell voltage after a sudden interruption in current drain. The OCV value, (U1), can only be measured as the initial cell voltage immediately after an interruption in the current drain. This is shown at Number 1 in FIG. 2. U1 can only be measured immediately after a current interruption and the value is typically up to 200 mV higher than the cell voltage observed during current drain due to the polarizing effect of the methanol cross-over at the cathode. This high cell voltage approaching the theoretical OCV is only observed when the methanol cross-over is low due to the low concentration gradient existing between the anode and the cathode at the moment the current drain terminates. However the observed potential changes rapidly thereafter due to a rise in methanol concentration gradient in the PEM driven by the high level of methanol concentration at the anode. The fall in the cell potential shown in Number 2 of FIG. 2 immediately after current drain interruption to the steady state U2 (see Number 3 of FIG. 2), observed after a time interval of typically 10 to 100 seconds, is due to the resulting rise in methanol concentration at the cathode due to cross-over diffusion. The kinetics of this change can be assessed using conventional mathematical procedures to obtain accurate information on the rate of diffusion and thus cross-over of methanol to the cathode. It has been found that the transient build-up of methanol at the cathode due to cross-over diffusion can be assessed rapidly by use of the first differential (dU/dt) of the potential change after current drain interruption. By calculation this voltage drop rate yields an accurate estimate of the mass-transfer coefficient and is then used to quantify the mass-transfer and to obtain a reliable estimate of the true open cell voltage. Alternatively the amount of reactant methanol can be assessed by summing the potential change as a function of time. The integral obtained (see Number 4 of FIG. 2) thus quantifies the energy contained in the methanol transferred to the cathode. This reactant quantity can be equated with the coulomb equivalent of the energy of the methanol fuel transferred to the cathode. The use of dynamic response curves and transients is described by P. Argyropoulos et al. in "Dynamic response of the direct methanol fuel cell under variable load conditions", Journal of Power Sources 87 (2000) 153-161. In an analogue manner, the information obtained by a response to current drain perturbation can be obtained by perturbing the supply of reactant air and fuel to the stack and obtaining relevant data from the response in cell potential U. Experimentally obtained data define the characteristics of the stack and are used to control adequate methanol supply in all operating conditions compensating for methanol loss due to cross over and utilizing the heat of reaction at the cathode to maintain stable operation at low power drain in sub-zero temperatures. In order to do this ancillary pumps pump highly concentrated methanol in order to adjust the methanol concentration at the anode to the necessary concentration, and air supply and current drain can be re-established to maintain the cell stack above the freezing temperature.

For the methods and systems of the present invention, a DMFC fuel-cell is fitted with all ancillaries and peripheral supply units. More specifically, the DMFC is fitted with a means for diagnostic air-interrupt function or momentarily disconnecting the DMFC from its load, a means for measuring voltage decay of a stack, section and/or single cell of the DMFC, a means for assessing the cell and stack condition and/or methanol demand based upon measured voltages; and a means for correctively adjusting methanol concentration of the DMFC. Various means with such functions are known to those skilled in the art and are commercially available. For example, in one embodiment, the stack current and interruption of stack current is achieved via an electronically controlled Load (Höcherl & Hackl Z S electronic load). Methanol concentrations can be verified using a density meter such as that commercially available from ANTON PAAR—DMA 35. Cell voltages can be measured differentially, for example, with an INA333 instrumentation amplifier, and sampled with an ANS8320 Analog-to-digital converter and an LPC2387 micro-controller. Temperatures can be measured with, for example, a Resistance thermometer (PT100 element) and data can be logged with a micro-controller such as the LPC2387 micro-controller.

The following nonlimiting example further illustrates the present invention.

EXAMPLE 1

A nominally 500 Watt DMFC fuel-cell was set up with all ancillaries and peripheral supply units. The DMFC was fitted with means of monitoring stack, section and single cell voltage measurement devices.

To allow for operation at low current densities, where fuel and oxidizing air flow is low, denuded air exiting the stack flow drains downwards and all fuel exiting the stack flows upwards. This ensures that $CO_2$ gas entrained in the fuel system will exhaust upwards and that water in the air will flow downwards. This feature avoids plugging the free flow of reactants in the cell.

During DMFC stack startup, the methanol and water fuel tank are initially filled with fuel containing 1.0 molar methanol. Diffusion considerations have limited the range to a preferred range from 0.5-2M, most preferably 1.0M methanol which is used as it represents a suitable compromise between considerations of power density of the stack and restriction of the extent of cross-over diffusion and back-reaction in the single cell of the stack. A pump ensured that the correct amount of fuel filled the system and reached the anodic MEA surface.

When the cell operates at low power for protracted periods, methanol diffusion through the electrolyte membrane meets air at the catalytic surface on the oxidizing surface of the air channel and quickly oxidizes to water. Reaction product entrainment on the oxidant side can accumulate and lead to blockage unless drained gravitationally.

During startup for the first time the MEAs are activated as disclosed in published U.S. Patent Application No. 20090269625A1. The membrane electrode assembly is initialized and activated by repeatedly applying an increasing or decreasing potential in each of a plurality of cycles over a voltage range of at least 0.1 volts, e.g., at least 0.2 volts or at least 0.3 volts, until the membrane, electrode assembly is substantially activated.

Subsequently normal operation was commenced by activating all supply pumps at the required dosage rating. Adequate fuel and air oxidant was supplied to the reactor MEA surfaces and the open cell voltages were checked to be within the expected ranges in all cells in the stack. Assessment of the cell and stack condition used a data-logging computing function that is programmed on the control algorithm described above and which is based on experimental data in order to calculate the values of the functions utilized. After the expected OCV level was attained and the single cells and the stack were considered to be in an established regime of normal operation, the current drain was interrupted by disconnecting the cell for 10 seconds and the cell voltage monitored. The length of the current drain interrupt only needs to be sufficiently long to enable a reliable measurement of the value of $dU/dt$.

The cell voltage level decayed to a level of 0.67 Volts per cell. The change in potential was 0.19 Volts. The voltage decay was data-logged and the value stored in a computer device and then evaluated using the functional algorithm in order to calculate the methanol concentration needed for maintaining the desired stable stack operating conditions at 70° C. Thereafter the current drain was restored.

The methanol consumption was observed as 4.7 ml methanol/minute and system peripherals required 80 Watts of power to support the running needs and maintain a stack temperature of 70° C.

Upon varying the stack load in steps, actual methanol consumption was dependent on the stack temperature and electrical power drain. The methanol concentration was automatically adjusted via a metering fuel pump to the correct level at the required power output. The stack was then placed in a refrigerator at −20° C. and normal operation was resumed. The load was reduced and the stack approached stand-by.

A dummy load was connected to the cell in order to drain a low level of power to supply peripheral equipment for which power demand was 30 Watts, which was insufficient power to maintain a cathode temperature above 5° C. On reaching a cathode temperature of 5° C. the methanol metering pump began to raise the methanol concentration at the anode to 4.2 M in order to maintain a stack operating temperature of 5° C.

The equipment was maintained at ambient temperature −20° C. for 8 hours and then reheated to 70 degrees operating temperature by supplying more methanol to the anode without increasing power drain beyond the needs to support the internal needs of the ancillary and peripheral equipment. On reaching 70° C. the equipment was re-cooled and re-heated for 5 cycles in order to demonstrate the reliability of the method of operating. This demonstrates that the cross-over control mechanism is a reliable method of heating to a specified stack temperature and is capable of maintaining a set temperature at power output levels from maximum at full-power to minimum at stand-by.

The combination of compensatory fuel concentration adjustment combined with the analysis of the cell potential change on current drain interruption provided the basis for corrective adjustment of the methanol concentration on resumption of operation at allocated electrical load.

The diagnostic procedure must be repeated at intervals with a period which varies depending on the operation conditions. Thus, normal ambient temperatures allow diagnostic monitoring intervals of 30 minutes or more while intervals may be reduced when the ambient temperature falls to near freezing, e.g. 10 minutes between diagnostic events.

What is claimed is:

1. A method for operating a direct methanol fuel cell (DMFC) at variable power levels and protecting the DMFC from transient variations in ambient temperature, said method comprising:
   (a) arranging a DMFC stack so that denuded air exiting the stack drains downward and all fuel exiting the stack flows upward;
   (b) continuously monitoring voltage of a stack, section and/or single cell of the DMFC;
   (c) interrupting continuous operation of the DMFC suddenly and observing voltage decay;
   (d) assessing cell and stack conditions and/or methanol demand based upon the measured voltages via the algorithm $F_{MeOH\_Dose} = F_{Stoich} + F_{cross} + F_{Temp} + F_{dU/dt}$,
   wherein $F_{meOH\_Dose}$ is the amount of pure methanol supplied to the anode mixing chamber of the DMFC fuel cell,
   $F_{Stoich}$ is the amount of methanol reactant to be supplied to the anode mixing chamber of the DMFC fuel cell due to consumption by current supply and evaporation losses,
   $F_{cross}$ is the amount of methanol supplied to the anode mixing chamber of the DMFC fuel cell in order to compensate for methanol diffusion from anode to cathode,
   $F_{Temp}$ is the amount of methanol required to maintain a stack configuration at a selected operating temperature, and
   $F_{dU/dt}$ is the amount of reactant methanol available at the anode as determined by the cell potential during a diagnostic current step or alternatively by a perturbation of fuel and oxidant flow; and
   (e) correctively adjusting methanol concentration of the DMFC.

2. A system for operating a direct methanol fuel cell (DMFC) at variable power levels and protecting the DMFC from transient variations in ambient temperature, said system comprising:
   (a) a DMFC stack arranged so that denuded air exiting the stack drains downward and all fuel exiting the stack flows upward;
   (b) an air pump for diagnostic air-interrupt function or an electronically controlled load for momentarily disconnecting the DMFC from its load;
   (c) an instrumentation amplifier, analog-to-digital converter and micro-controller for measuring voltage decay of a stack, section and/or single cell of the DMFC;
   (d) a computer for assessing the cell and stack condition and/or methanol demand based upon measured voltages via the algorithm $F_{MeOH\_Dose} = F_{Stoich} + F_{cross} + F_{Temp} + F_{dU/dt}$,
   wherein $F_{MeOH\_Dose}$ is the amount of pure methanol supplied to the anode mixing chamber of the DMFC fuel cell,
   $F_{Stoich}$ is the amount of methanol reactant to be supplied to the anode mixing chamber of the DMFC fuel cell due to consumption by current supply and evaporation losses,
   $F_{cross}$ is the amount of methanol supplied to the anode mixing chamber of the DMFC fuel cell in order to compensate for methanol diffusion from anode to cathode,
   $F_{Temp}$ is the amount of methanol required to maintain a stack configuration at a selected operating temperature, and
   $F_{dU/dt}$ is the amount of reactant methanol available at the anode as determined by the cell potential during a diagnostic current step or alternatively by a perturbation of fuel and oxidant flow;
   (e) a methanol tank connected to a pump for correctively adjusting methanol concentration of the DMFC; and
   (f) a microcontroller for continuously monitoring stack, section and/or single cell voltage measurement devices.

3. The system of claim 2 which operates without use of a methanol sensor control system.

4. The system of claim 2 which operated without use of a freezing point depressant.

5. The method of claim 1 further comprising maintaining frost free conditions in the DMFC stack by utilizing energy released by oxidation of cross-over methanol, wherein the cross-over methanol is methanol fuel that has diffused into a cathode of the DMFC stack.

* * * * *